US009143688B2

(12) United States Patent
Noguchi (10) Patent No.: US 9,143,688 B2
(45) Date of Patent: Sep. 22, 2015

(54) IMAGE CAPTURING APPARATUS AND CONTROL METHOD THEREFOR

(71) Applicant: CANON KABUSHIKI KAISHA, Tokyo (JP)

(72) Inventor: Masaaki Noguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/306,564

(22) Filed: Jun. 17, 2014

(65) Prior Publication Data

US 2014/0293075 A1  Oct. 2, 2014

Related U.S. Application Data

(63) Continuation of application No. 13/567,221, filed on Aug. 6, 2012, now Pat. No. 8,792,038.

(30) Foreign Application Priority Data

Aug. 18, 2011 (JP) ................................. 2011-179208
Jul. 4, 2012 (JP) ................................. 2012-150752

(51) Int. Cl.
*H04N 5/222* (2006.01)
*H04N 5/228* (2006.01)
*G03B 17/00* (2006.01)
*H04N 5/232* (2006.01)

(52) U.S. Cl.
CPC ......... *H04N 5/23267* (2013.01); *H04N 5/2328* (2013.01); *H04N 5/23216* (2013.01); *H04N 5/23245* (2013.01); *H04N 5/23258* (2013.01); *H04N 5/23293* (2013.01)

(58) Field of Classification Search
USPC .................... 348/208.99–208.16, 222.1, 241, 348/333.01–333.13; 382/254–255; 396/52–55
See application file for complete search history.

(56) References Cited

U.S. PATENT DOCUMENTS

| 5,598,242 | A | * | 1/1997 | Omi et al. ........................ 396/55 |
| 5,940,631 | A | | 8/1999 | Hirano et al. |
| 6,091,448 | A | | 7/2000 | Washisu et al. |
| 6,097,895 | A | | 8/2000 | Furuyama |

(Continued)

FOREIGN PATENT DOCUMENTS

| CN | 1719329 A | 1/2006 |
| CN | 1892293 A | 1/2007 |

(Continued)

OTHER PUBLICATIONS

Nov. 14, 2014 Chinese Office Action in a foreign counterpart application (Chinese Patent Application No. 201210298091.2).

(Continued)

*Primary Examiner* — Michael Osinski
(74) *Attorney, Agent, or Firm* — Fitzpatrick, Cella, Harper & Scinto (57) ABSTRACT

An image capturing apparatus having a plurality of executable image blurring correction modes selects an image blurring correction mode to be executed from among the executable image blurring correction modes in accordance with an image capturing situation, and executes the selected image blurring correction mode. The image capturing apparatus has a plurality of display items respectively associated with the image blurring correction modes, and displays the display item corresponding to the image blurring correction mode under execution on a display screen.

18 Claims, 8 Drawing Sheets

| SHAKE COMPENSATION MODE | IMAGE CAPTURING MODE | | DISPLAY ICON |
|---|---|---|---|
| | STILL IMAGE | MOVING IMAGE | |
| NORMAL STILL IMAGE MODE | ● | - | |
| PANNING MODE | ● | - | |
| SHIFT SHAKE CORRECTION MODE | ● | ● | |
| NORMAL MOVING IMAGE MODE | - | ● | |
| LARGE SHAKE CORRECTION MODE | - | ● | |
| CONSTANT POINT CAPTURING MODE | - | ● | |
| TRIPOD MODE | ● | ● | |

(56) References Cited

U.S. PATENT DOCUMENTS

| | | |
|---|---|---|
| 6,765,612 B1 | 7/2004 | Anderson et al. |
| 7,164,853 B2 | 1/2007 | Tomita |
| 7,400,823 B2 | 7/2008 | Kakiuchi |
| 7,672,578 B2 | 3/2010 | Shibata |
| 7,783,180 B2 | 8/2010 | Kanda et al. |
| 7,825,978 B2 | 11/2010 | Ito et al. |
| 8,040,381 B2 | 10/2011 | Yumiki et al. |
| 8,300,117 B2 | 10/2012 | Carter et al. |
| 8,611,733 B2 | 12/2013 | Ohishi |
| 8,774,616 B2 * | 7/2014 | Nakata .............. 396/76 |
| 2001/0022624 A1 | 9/2001 | Tanaka et al. |
| 2003/0146984 A1 | 8/2003 | Sakaguchi et al. |
| 2004/0155974 A1 | 8/2004 | Hong |
| 2004/0263635 A1 | 12/2004 | Katagiri et al. |
| 2005/0052538 A1 | 3/2005 | Sato et al. |
| 2005/0231604 A1 * | 10/2005 | Daita .............. 348/208.99 |
| 2006/0051081 A1 | 3/2006 | Ogino |
| 2006/0284984 A1 | 12/2006 | Takemoto et al. |
| 2007/0014543 A1 | 1/2007 | Nakase et al. |
| 2007/0065129 A1 | 3/2007 | Shiratori |
| 2007/0122134 A1 | 5/2007 | Suzuki |
| 2007/0132856 A1 | 6/2007 | Saito et al. |
| 2007/0159549 A1 | 7/2007 | Matsumoto |
| 2007/0188647 A1 | 8/2007 | Ikeda |
| 2007/0195186 A1 | 8/2007 | Okada |
| 2008/0036895 A1 | 2/2008 | Kosaka |
| 2008/0180549 A1 * | 7/2008 | Lee et al. .............. 348/231.2 |
| 2008/0204565 A1 | 8/2008 | Yumiki |
| 2008/0225155 A1 | 9/2008 | Ebato et al. |
| 2008/0260375 A1 | 10/2008 | Yumiki |
| 2009/0040357 A1 | 2/2009 | Ichii et al. |
| 2009/0051816 A1 | 2/2009 | Ota |
| 2009/0128640 A1 | 5/2009 | Yumiki |
| 2009/0225179 A1 | 9/2009 | Ohashi et al. |
| 2009/0225202 A1 * | 9/2009 | Hata .............. 348/241 |
| 2009/0290038 A1 | 11/2009 | Yamagata et al. |
| 2010/0088643 A1 | 4/2010 | Ota et al. |
| 2010/0134644 A1 | 6/2010 | Kita |
| 2011/0105181 A1 | 5/2011 | McLeod |
| 2011/0115940 A1 | 5/2011 | Ojima et al. |
| 2011/0128392 A1 * | 6/2011 | Kumagai .............. 348/208.5 |
| 2011/0149105 A1 | 6/2011 | Sasaki |
| 2011/0298937 A1 * | 12/2011 | Ogawa et al. .............. 348/208.4 |
| 2012/0008035 A1 * | 1/2012 | Ichii et al. .............. 348/333.01 |
| 2012/0086846 A1 | 4/2012 | Fuh et al. |
| 2012/0127357 A1 * | 5/2012 | Park et al. .............. 348/333.02 |
| 2012/0201426 A1 | 8/2012 | Jasinski et al. |
| 2012/0249853 A1 | 10/2012 | Krolczyk et al. |
| 2013/0107074 A1 * | 5/2013 | Yamagata et al. .............. 348/222.1 |
| 2014/0036108 A1 | 2/2014 | Yoon et al. |
| 2014/0192229 A1 * | 7/2014 | Kim et al. .............. 348/231.3 |

FOREIGN PATENT DOCUMENTS

| | | |
|---|---|---|
| CN | 101025540 A | 8/2007 |
| CN | 101251702 A | 8/2008 |
| CN | 101252643 A | 8/2008 |
| JP | 2007-279394 A | 10/2007 |
| JP | 2009-204628 A | 9/2009 |

OTHER PUBLICATIONS

Jul. 13, 2015 Chinese Office Action concerning corresponding Chinese Patent Application No. 201210298091.2.

* cited by examiner

| SHAKE COMPENSATION MODE | IMAGE CAPTURING MODE | | DISPLAY ICON |
|---|---|---|---|
| | STILL IMAGE | MOVING IMAGE | |
| NORMAL STILL IMAGE MODE | ● | – |  |
| PANNING MODE | ● | – |  |
| SHIFT SHAKE CORRECTION MODE | ● | ● |  |
| NORMAL MOVING IMAGE MODE | – | ● |  |
| LARGE SHAKE CORRECTION MODE | – | ● |  |
| CONSTANT POINT CAPTURING MODE | – | ● |  |
| TRIPOD MODE | ● | ● |  |

IMAGE CAPTURING APPARATUS AND CONTROL METHOD THEREFOR

This application is a continuation of application Ser. No. 13/567,221, filed Aug. 6, 2012, which was allowed on Apr. 1, 2014.

BACKGROUND OF THE INVENTION

1. Field of the Invention

The present invention relates to an image capturing apparatus, and more particularly to an image capturing apparatus having a camera shake correction function and a control method for the same.

2. Description of the Related Art

Image capturing apparatuses equipped with image blurring correction devices (also called camera shake correction devices) for detecting shake of the image capturing apparatuses and driving photographing lenses to correct image blur caused due to the detected shake are known. With regard to image capturing apparatuses having such image blurring correction devices, a camera shake alert display function is known, which is used to make recognition of the on/off state of image blurring correction easy, and to notify of whether or not camera shake based on a camera shake shutter speed limit is occurring. (See Japanese Patent Laid-Open No. 2007-279394)

In recent years, there have been various image blurring correction techniques, such as techniques for correcting not only angle shake but also shift shake, which occurs when the camera undergoes translational movement, and for broadening the anti-vibration range at the wide-angle end side during moving image recording and improving image blurring correction effect on large camera shake caused due to shooting while walking, and the like. Appropriate image blurring correction control is performed upon the functions suitable for an image capturing situation being automatically selected from among several types of image blurring correction functions prepared in advance.

Meanwhile, in Japanese Patent Laid-Open No. 2007-279394 mentioned above, a problem arises in that as for the status of image blurring correction, only information on the on/off state is displayed, and a user cannot recognize which function among those various image blurring correction functions is currently being used.

SUMMARY OF THE INVENTION

The present invention was made in consideration of the above-described problem, and according to one embodiment thereof, an image capturing apparatus in which a user can easily recognize the image blurring correction control under execution is provided.

According to one aspect of the present invention, there is provided an image capturing apparatus capable of executing a plurality of image blurring correction modes, comprising: a correction unit configured to select an image blurring correction mode from among the plurality of image blurring correction modes in accordance with an image capturing situation and execute the selected image blurring correction mode; and a display unit configured to have a plurality of display items respectively associated with the plurality of image blurring correction modes, for selecting a display item corresponding to the image blurring correction mode under execution by the correction unit from among the plurality of display items, and display the selected displayed item on a display screen.

Also, according to an aspect of the present invention, there is provided an image capturing apparatus capable of selecting and operating in one of a moving image capturing mode and a still image capturing mode, and executing a plurality of image blurring correction modes, comprising: a correction unit configured to select an image blurring correction mode from among the plurality of image blurring correction modes in accordance with an image capturing situation and execute the selected image blurring correction mode, a group of a plurality of image blurring correction modes for the moving image capturing mode and a group of a plurality of image blurring correction modes for the still image capturing mode respectively including at least one different image blurring correction mode; and a display unit configured to have a plurality of display items respectively associated with the plurality of image blurring correction modes, for selecting a display item corresponding to the image blurring correction mode under execution by the correction unit from among the plurality of display items, and display the selected displayed item on a display screen, wherein an item to be displayed is different between the moving image capturing mode and the still image capturing mode.

Furthermore, according to an aspect of the present invention, there is provided a method for controlling an image capturing apparatus having a plurality of executable image blurring correction modes, the method comprising: a step of selecting an image blurring correction mode from among the plurality of image blurring correction modes in accordance with an image capturing situation and executing the selected image blurring correction mode, and a step of selecting, from among a plurality of display items that are respectively associated with the plurality of image blurring correction modes, a displayed item corresponding to the image blurring correction mode that is under execution in the executing step.

Further features of the present invention will become apparent from the following description of exemplary embodiments (with reference to the attached drawings).

DESCRIPTION OF THE EMBODIMENTS

An embodiment of the present invention will be hereinafter described in detail with reference to the drawings. Note that in the following description of the embodiment, a digital camera 1 capable of capturing still images and moving images is taken as an example of an image capturing apparatus having a plurality of executable shake compensation modes.

Figure 1:
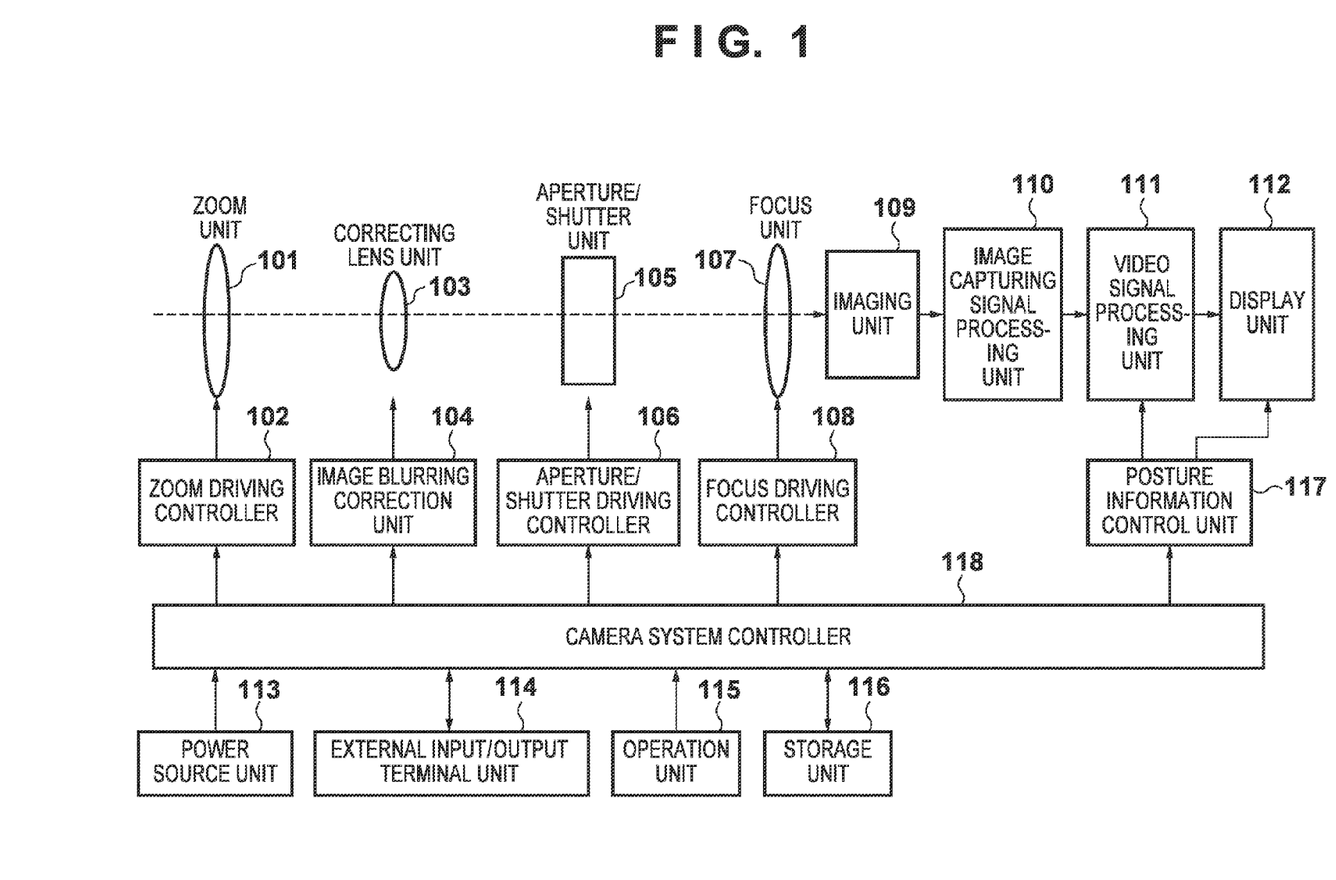
FIG. 1 is a block diagram of a digital camera serving as an image capturing apparatus according to an embodiment.

FIG. 1 is a block diagram showing an exemplary configuration of the digital camera 1, which is an image capturing apparatus according to the embodiment. In FIG. 1, a zoom unit 101 includes a zoom lens whose magnification ratio is variable. A zoom driving controller 102 controls driving of the zoom unit 101. A correcting lens unit 103 has a shift lens capable of moving on a plane perpendicular to an optical axis to change its own position. An image blurring correction unit 104 controls driving of the correcting lens unit 103 to correct image blur caused due to camera shake or the like.

An aperture/shutter driving controller 106 controls driving of an aperture/shutter unit 105. A focus unit 107 includes a lens that performs focus adjustment. A focus driving controller 108 controls driving of the focus unit 107. The zoom unit 101, the correcting lens unit 103, the aperture/shutter unit 105, and the focus unit 107 are arranged within a photographing lens for forming an object image on an imaging unit 109.

The imaging unit 109 converts an optical image formed through the lens group into an electric signal. An image capturing signal processing unit 110 performs processing for converting the electric signal output by the imaging unit 109 into a video signal. A video signal processing unit 111 processes the video signal output by the image capturing signal processing unit 110 according to intended use. A display unit 112 displays a setting menu, captured images, images (through-the-lens image) based on signals output by the video signal processing unit 111, or the like as necessary. A power source unit 113 supplies power to the entire system. An external input/output terminal unit 114 externally inputs and outputs communication signals and video signals. An operation unit 115 includes various switches and buttons for operating the image capturing apparatus. A storage unit 116 stores various data such as video information. A posture information control unit 117 determines posture of the image capturing apparatus and provides posture information. A camera system controller 118 controls the overall image capturing apparatus.

Next, operation of the digital camera 1 configured as described above will be described. The operation unit 115 has a shutter release button (not shown) serving as an instruction member configured such that a first switch (SW1) for instructing an image capturing preparation operation and a second switch (SW2) for instructing an image capturing operation are turned on in this order in accordance with the degree of pressing. The first switch (SW1) is turned on upon the shutter release button being half-pressed, and the second switch (SW2) is turned on upon the shutter release button being completely pressed.

Upon the first switch (SW1, image capturing preparation instruction) being turned on, the focus driving controller 108 drives the focus unit 107 to perform focus adjustment, and the aperture/shutter driving controller 106 drives the aperture/shutter unit 105 to set an appropriate exposure. Upon the second switch (SW2, image capturing instruction) being turned on, an optical image is exposed on the imaging unit 109, and image data obtained based on an electric signal converted by an image sensor is stored in the storage unit 116.

At this time, if an instruction to turn on the image blurring correction is given by the operation unit 115, the camera system controller 118 instructs the image blurring correction unit 104 to perform an image blurring correction operation, and the image blurring correction unit 104, upon receiving this instruction, performs an anti-vibration operation until an instruction to turn off the image blurring correction is given.

If the operation unit 115 is not operated for a certain period of time, the camera system controller 118 gives an instruction to interrupt power of a display provided in the display unit 112 to save electricity.

In the digital camera 1, a still image capturing mode for capturing still images or a moving image capturing mode mainly for capturing moving images can be selected by operating the operation unit 115. Therefore, operation settings for each actuator (variable element) that constitutes the digital camera 1 can be changed in the respective image capturing modes.

Note that upon an instruction to change the magnification ratio with the zoom lens being input via the operation unit 115, the zoom driving controller 102 that receives the instruction via the camera system controller 118 drives the zoom unit 101 and moves the zoom lens to an instructed zoom position. Further, the focus driving controller 108 drives the focus unit 107 and performs focus adjustment based on image information processed by the image capturing signal processing unit 110 and the video signal processing unit 111.

Figure 2:
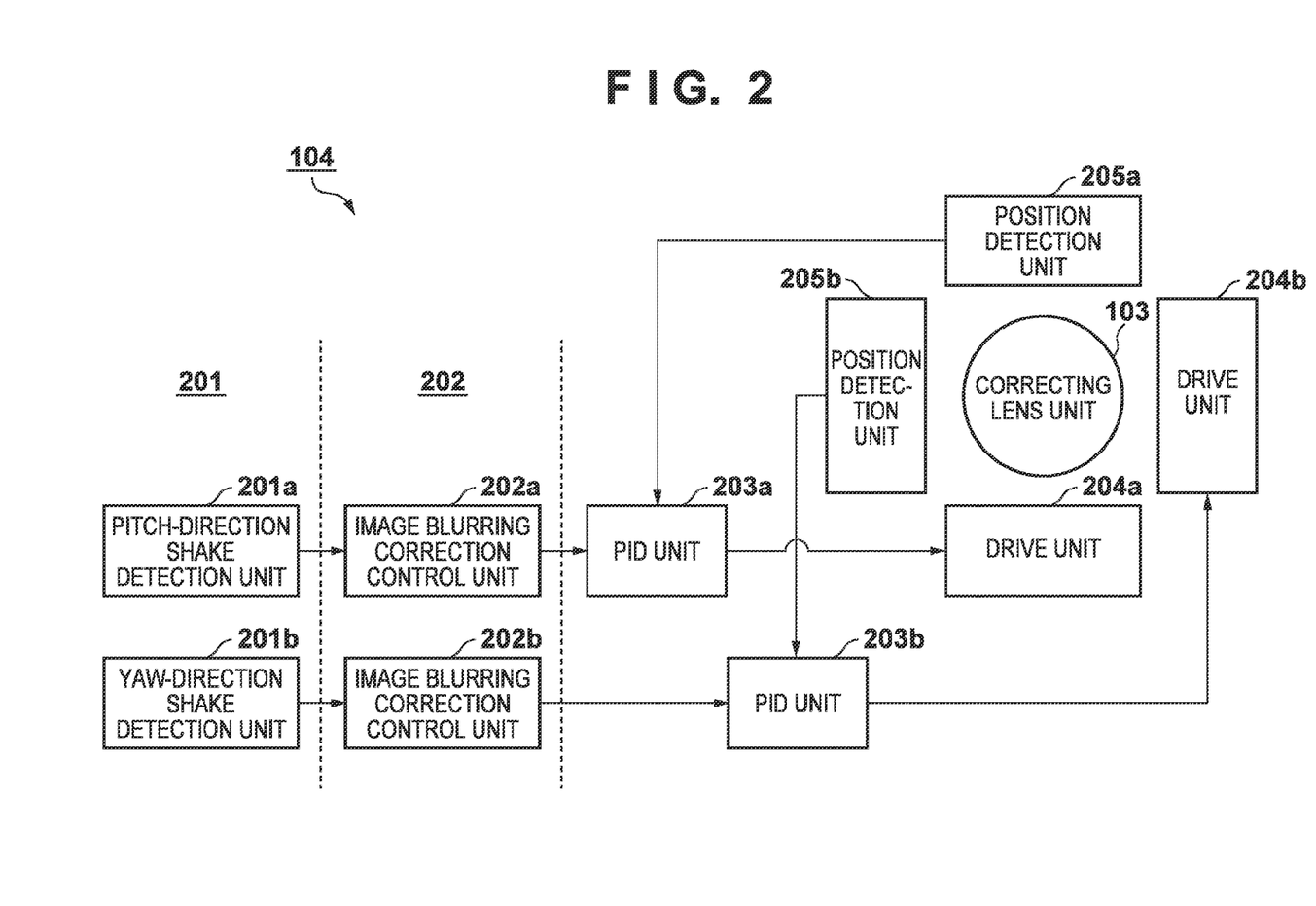
FIG. 2 is a block diagram showing an internal configuration of an image blurring correction unit 104.

FIG. 2 is a block diagram showing an internal configuration of the image blurring correction unit 104.

A shake detection unit 201 detects shake of the digital camera 1 in a normal posture (a posture in which the longitudinal direction of an image frame is substantially aligned with the horizontal direction) in the vertical and horizontal directions (pitch and yaw directions) and outputs a shake signal. The shake detection unit 201 may be, for example, a sensor such as a vibration gyro or an acceleration sensor, and may detect motion vectors between images or detect vibration based on an external force applied to the correcting lens unit 103. Further, a plurality of different types of sensors may also be used. For example, if the shake detection unit 201 is a gyro sensor, it detects angular velocity components of vibration of the digital camera 1 in the vertical and horizontal directions and outputs an angular velocity signal.

The shake detection unit 201 includes a pitch-direction shake detection unit 201a and a yaw-direction shake detection unit 201b that serve as a vibration detection means for detecting vibration applied to the digital camera 1. The pitch-direction shake detection unit 201a detects an angular velocity component in the pitch direction in vibration of the digital camera 1 in a normal posture (a posture in which the longitudinal direction of an image frame is substantially aligned with the horizontal direction) in the vertical direction (pitch direction), and outputs a shake signal (e.g., an angular velocity signal). The yaw-direction shake detection unit 201b detects an angular velocity component in the yaw direction in vibration of the digital camera 1 in the normal posture in the horizontal direction (yaw direction), and outputs a shake signal (angular velocity signal). Note that in the present embodiment, an optical axis extending towards an object is a Z-axis, the vertical direction of the digital camera 1 is a Y-axis, and the horizontal direction thereof is an X-axis. Accordingly, shake in the vertical direction (around the X-axis) of the digital camera 1 is in the pitch direction, and shake in the horizontal direction (around the Y-axis) is in the yaw direction.

An image blurring correction control unit 202a computes a correcting lens position control signal in the pitch direction based on the shake signal of the pitch-direction shake detection unit 201a. Similarly, the image blurring correction control unit 202b computes a correcting lens position control signal in the yaw direction based on the shake signal of the yaw direction shake detection unit 201b. The correcting lens position control signals respectively in the pitch and yaw directions are signals indicating drive target positions of the correcting lens unit 103. Hall effect sensors (position detection means) in position detection units 205a and 205b detect the position of the correcting lens unit 103 in the pitch direction and the yaw direction by detecting a magnetic field of a magnet attached to the correcting lens unit 103, and outputs a position signal. In the present embodiment, the Hall effect sensors are used as the position detection means, but position detection methods such as a PSD (Position Sensitive Detector) may alternatively be used.

A PID unit 203a and a PID unit 203b respectively calculate a control amount from a deviation between the correcting lens position control signals being output by the image blurring correction control units 202a and 202b and the position signals output by the position detection units 205a and 205b, and output drive command signals. A drive unit 204a and a drive unit 204b, which serve as driving means, drive the correcting lens unit 103 respectively based on the drive command signals sent from the PID units 203a and 203b. Thus the PID units 203a and 203b perform feedback control such that the position signals converge into the correction position control signals sent from the image blurring correction control units 202a and 202b, respectively.

The pitch-direction correcting lens position control signal of the image blurring correction control unit 202a computed based on the shake signal from the pitch-direction shake detection unit 201a is a signal indicating a movement target position (image blurring correction position) in the pitch direction. Similarly, the yaw-direction correcting lens position control signal of the image blurring correction control unit 202b computed based on the shake signal from the yaw-direction shake detection unit 201b is a signal indicating a movement target position (image blurring correction position) in the yaw direction.

Accordingly, the position of the correcting lens unit 103 is moved in a direction in which image blur caused by shake of the digital camera 1 is corrected in accordance with the correcting lens position control signals respectively output by the image blurring correction control units 202a and 202b. Thus the correcting lens unit 103 that performs image blurring correction moves in up-down and left-right directions perpendicular to the optical axis, and is capable of preventing blurring when shaking of the digital camera 1 occurs.

Next, an outline of the operation of the image capturing apparatus having the above-described configuration according to the present embodiment will be described. Returning to FIG. 1, the operation unit 115 includes an anti-vibration switch that enables selection of a shake compensation (image stabilization) mode. Upon the shake compensation mode being selected by the anti-vibration switch, the camera system controller 118 instructs the image blurring correction unit 104 to perform an anti-vibration operation. The image blurring correction unit 104, upon receiving this instruction, performs the anti-vibration operation (image blurring correction operation) until an anti-vibration off instruction is given. The operation unit 115 also includes an image capturing mode selection switch that enables selection of one of the still image capturing mode and the moving image capturing mode, and is capable of changing operation conditions for each actuator in the respective image capturing modes. In an anti-vibration mode, the camera system controller 118 and the image blurring correction unit 104 effectively perform image blurring correction by selectively using some of the shake compensation modes in accordance with an image capturing status.

The operation unit 115 also includes the shutter release button configured such that the first switch (SW1) and the second switch (SW2) are turned on in this order in accordance with the degree of pressing. The switch SW1 is turned on upon the shutter release button being half-pressed, and the switch SW2 is turned on upon the shutter release button being completely pressed. Upon the switch SW1 being turned on, the focus driving controller 108 drives the focus unit 107 to perform focus adjustment, and the aperture/shutter driving controller 106 drives the aperture/shutter unit 105 to set an appropriate exposure. Upon the switch SW2 being turned on, image data obtained from an optical image exposed on the imaging unit 109 is stored in the storage unit 116.

Further, the operation unit 115 includes a moving image recording switch. Movie image capturing is started after this switch is pressed, and this moving image recording is terminated upon the switch being pressed again. The operation unit 115 also includes a playback mode selection switch that enables selection of a playback mode, which stops the anti-vibration operation during the playback mode.

The operation unit 115 also includes a magnification ratio change switch for giving an instruction to change a zoom magnification ratio. Upon the instruction to change the zoom magnification ratio being given by the magnification ratio change switch, the zoom driving controller 102 that receives the instruction via the camera system controller 118 drives the zoom unit 101 to move the zoom unit 101 to an instructed zoom position. At the same time, the focus driving controller 108 drives the focus unit 107 to perform focus adjustment based on the image information sent from the imaging unit 109 and processed by the respective signal processing units (110 and 111).

Figure 3:
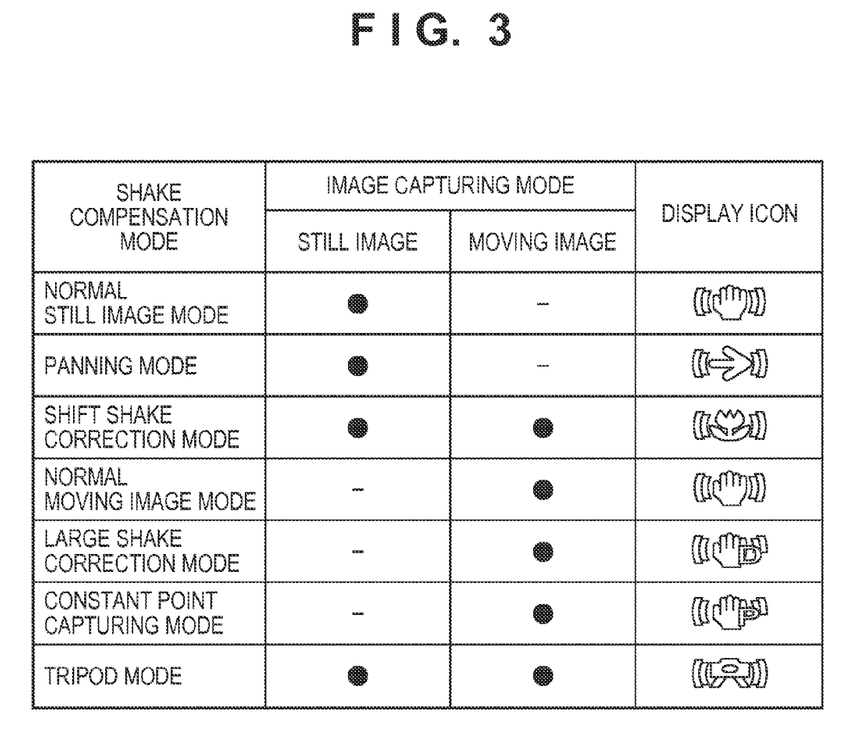
FIG. 3 is a diagram showing display icons corresponding to shake compensation modes for each image capturing mode.

FIG. 3 shows an example of the shake compensation modes for the respective image capturing modes and display items (icons are used in the present embodiment) associated with the respective shake compensation modes. Selectable shake compensation modes are different between still image capturing (in the still image capturing mode) and moving image capturing (in the moving image capturing mode). In the present embodiment, during still image capturing, a mode suitable for the shooting situation is selected from among four shake compensation modes, namely normal still image, panning, shift shake correction, and tripod modes, and the selected mode is executed. During the moving image capturing, a mode suitable for the shooting situation is selected from among five shake compensation modes, namely normal moving image, constant point capturing (fixed point capturing), large shake correction, shift shake correction, and tripod modes, and the selected mode is executed. That is, in the still image capturing mode and the moving image capturing mode, some of the shake compensation modes are the same and the others are different to suit the characteristics of the respective image capturing modes. A specific example of each of the executable shake compensation modes will be hereinafter described.

First, the shake compensation modes for still image capturing will be described.

Normal Still Image Mode

This is a shake compensation mode suitable for normal hand-held image capturing, which corrects angle shake caused due to hand-held image capturing while a user is holding the camera somewhat firmly. Note that in the shake compensation modes other than the shift shake correction mode described later, mainly angle shake solely is corrected.

Panning Mode

This is a mode in which when the camera is moved in one direction at a certain speed or faster for a fixed period of time, such as during image capturing while moving the camera to follow a moving object, image blurring correction in the camera moving direction is stopped, and image blurring correction is performed only on components orthogonal to the moving direction. That is, in the panning mode, image blurring correction in the shake direction is stopped after shake occurs in a fixed direction for a predetermined period of time. The camera can enter the panning mode for the respective movements in the up-down direction and the left-right direction, and is applied when, for example, the camera moves in a fixed direction at an angular velocity of 30 degrees/second for 0.5 seconds or longer.

Shift Shake Correction Mode

Shift shake, which is likely to occur when the distance to a main object is short and the image capturing magnification ratio is large, such as during macro photography, is corrected. To compute a shift shake amount here, a sensor for detecting an acceleration applied to the camera is necessary. Further, in the shift shake correction mode, both kinds of camera shake, namely angle shake and shift shake, are corrected. That is, the shift shake correction mode is a correction mode for correcting not only camera angle shake but also shift shake that occurs when the camera undergoes translational movement mainly in a macro area.

Tripod Mode

Image blurring correction is stopped when a camera swing amount (camera shake amount) is small, such as when the camera is set up on a tripod. The reasons for stopping image blurring correction include preventing a captured image from shaking while the camera is stationary, such as during long exposure capturing, due to low-frequency fluctuation noise output by the angular velocity sensor. Here, instead of stopping the image blurring correction, a method of eliminating low-frequency fluctuation components by raising cutoff of a high-pass filter used in camera shake amount computation may alternatively be used.

Next, the shake compensation modes for moving image capturing will be described. Note that the "shift shake correction mode" and the "tripod mode" are the correction modes executed in both image capturing modes for still image capturing and moving image capturing.

Normal Moving Image Mode

This is a normal shake compensation mode used during hand-held moving image capturing, where angle shake caused due to hand-held image capturing while the camera is held somewhat firmly is corrected. Here, in the moving image mode, anti-vibration settings different from those in the normal still image mode is configured to improve the view obtained by panning.

Constant Point Capturing Mode (Fixed Point Capturing Mode)

This mode is executed mainly at the telephoto end side, and the purpose of this mode is to enhance the anti-vibration effect on a lower frequency when the focal length is a predetermined value (e.g., 100 mm, according to conversion to 35 mm image sensor) or larger and the camera shake amount is a predetermined amount or smaller, and to thus prevent vibration more reliably than usual. The reason therefor is that during constant point capturing (fixed point capturing), shake, such as body shake, of a lower frequency than camera shake occurs even if the camera is firmly held, and that shake is conspicuous especially at the telephoto end side with a long focal length. In this constant point capturing mode (fixed point capturing mode), more weight is put on prevention of body shake (low-frequency shake) occurring when the camera is firmly held than on a bad view obtained by panning, and a distant object is shot in a firmly stopped state. That is, the constant point capturing mode (fixed point capturing mode) is a mode for enhancing the image blurring correction effect than usual when the shake amount at the telephoto end side is smaller than a predetermined amount.

Large Shake Correction Mode

This mode is executed mainly on the wide-angle end side with respect to large camera shake occurring during image capturing while walking, for example. To correct large shake, the anti-vibration range on the wide-angle end side is broadened, and panning processing is performed using a method other than the one normally used. That is, the large shake correction mode is a correction mode for broadening the image blurring correction range on the wide-angle end side and thus enhancing the image blurring correction effect more than usual.

Figure 4A:
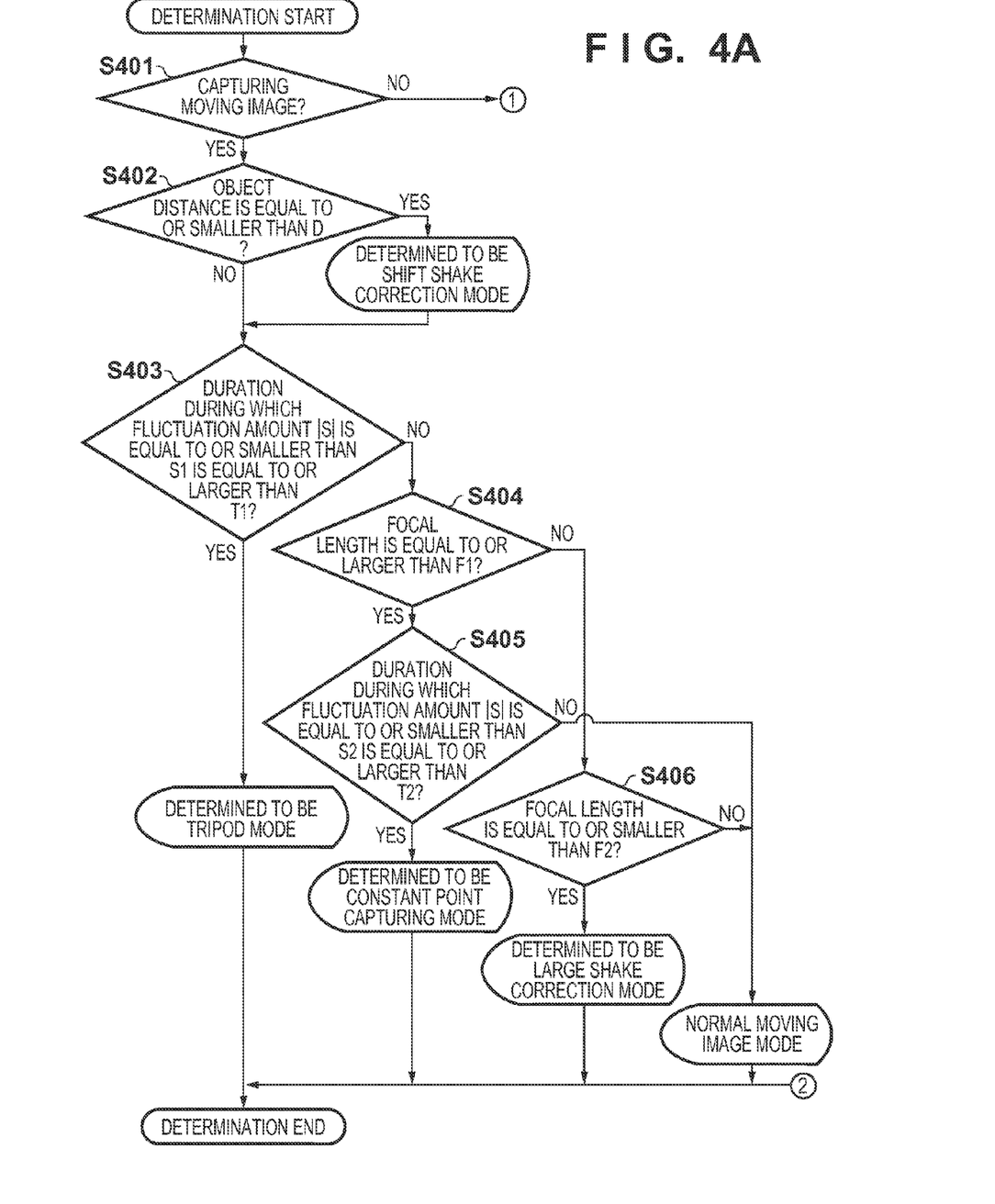
FIGS. 4A and 4B are flowcharts showing processing for deciding the shake compensation mode according to an embodiment.
Figure 4B:
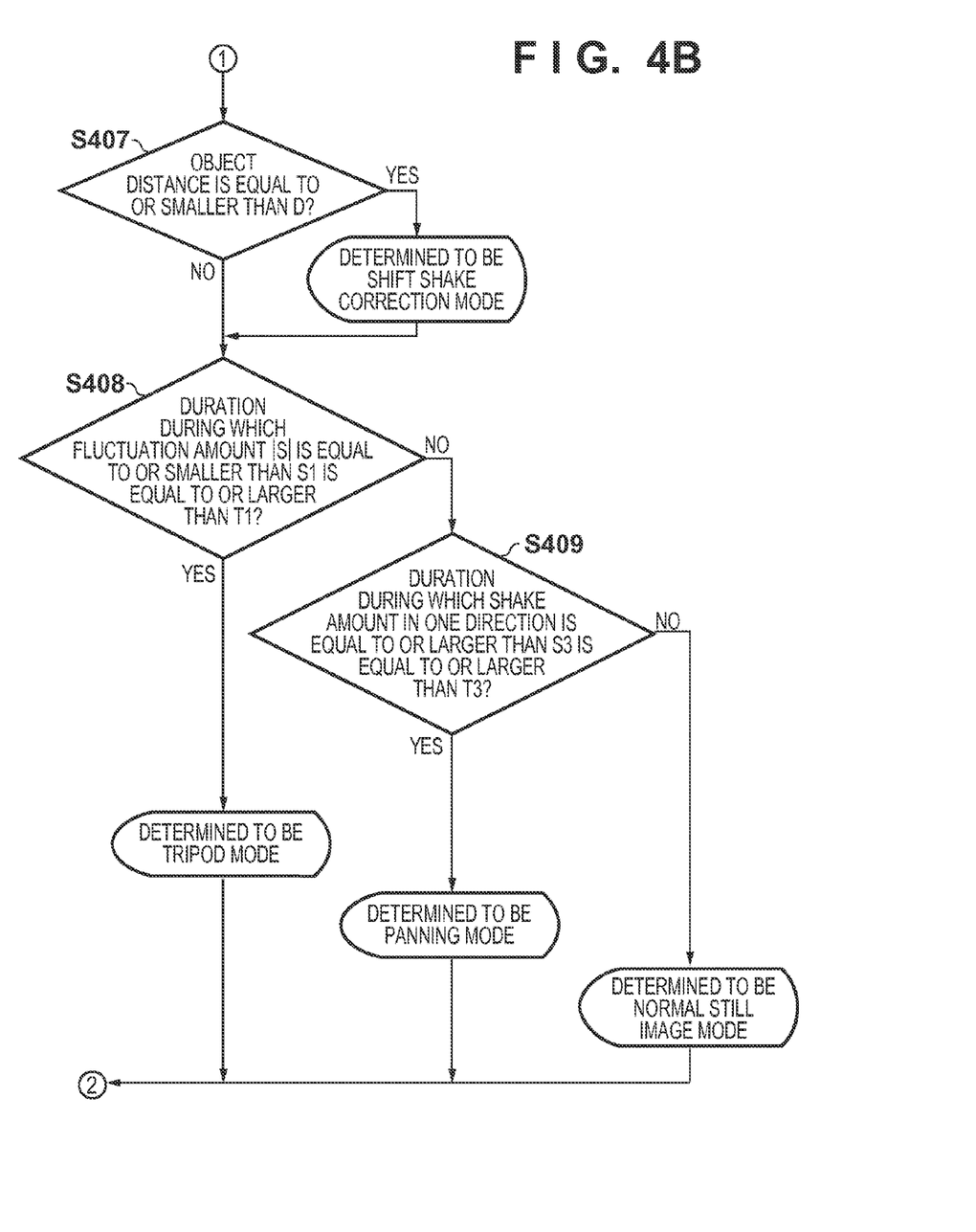

Next, shake compensation mode determination processing will be described using FIGS. 4A and 4B.

In S401, whether the digital camera 1 is in the still image capturing mode or the moving image capturing mode is determined. In S401, if the digital camera 1 is in the still image capturing mode (NO at S401), the processing proceeds from S401 to S407. In S407, whether or not an object distance obtained by the focus driving controller 108 is equal to or smaller than a threshold D is checked, and if the object distance is equal to or smaller than a threshold D, it is determined that the shake compensation mode is the shift shake correction mode, and the processing proceeds to S408. If the object distance is larger than the threshold D, the processing proceeds to S408 without determination. Note that determination may be performed using an index other than the object, such as the image magnification ratio. The object distance may be actually measured by using a distance measuring sensor. Also, the object distance may be determined by autofocus operation result. In this case, for example, the object distance can be obtained from calculation result of autofocus operation, position of focusing lens, or the like. Furthermore, index other than the object, such as image magnification, may be used for determining the object distance.

Next, in S408, if a duration during which an absolute value |S| of the camera shake amount is equal to or smaller than a threshold S1 is determined to be equal to or larger than a threshold T1 [second] (e.g., 3 seconds), it is determined that the shake compensation mode is the tripod mode, and the shake compensation mode determination ends. Note that determination of the tripod mode is performed using the absolute value of the camera shake amount here, but it may alternatively be performed employing a method using an amplitude and/or a frequency of camera shake.

If the fluctuation amount absolute value |S| is equal to or larger than S1, or if the fluctuation amount absolute value |S| is equal to or smaller than S1 while the duration is equal to or smaller than T1, the processing proceeds to S409. In S409, it is determined whether or not shake continues in one direction and the absolute value |S| of the camera shake amount is equal to or larger than a threshold S3, and the shake compensation mode is determined to be the panning mode if conditions are satisfied, and the shake compensation mode determination ends. Here, it is assumed that the threshold of the duration is T3 [second] (e.g., 0.5 seconds). Note that aside from the shake amount absolute value and the duration, an object moving speed may be detected and used as a parameter in panning mode determination. If the conditions are not satisfied in S409 (NO in S409), the shake compensation mode is determined to be the normal still image mode, which is the default setting, and the shake compensation mode determination ends.

In S401, if the digital camera 1 is in the moving image capturing mode (YES at S401), the processing proceeds from S401 to S402.

In S402, as in S407, whether the object distance is equal to or smaller than a threshold D is checked. If the object distance is equal to or smaller than the threshold D or shorter (YES at S402), the shake compensation mode is determined to be the shift shake correction mode. Note that with regard to the object distance at this time, the distance to the object may be actually measured by using a distance measuring sensor, but an autofocus result may also be used. In this case, a result of the object distance computation based on the autofocus result, or a result of computation using the focus lens position or the like may be used as the object distance. Note that determination may be performed using an index other than the object, such as an image magnification ratio.

Next, in S403, as in S408, whether or not the shake compensation mode is the tripod mode is determined. In S403, if the shake compensation mode is determined to be the tripod mode (YES at S403), the shake compensation mode determination ends. If, in S403, the shake compensation mode is not determined to be the tripod mode (NO at S403), the processing proceeds to S404. Here, determination in S402 and S403 is the same as that for the still image capturing mode and the detailed description thereof will be omitted, but the thresholds D, S, S1, and T1, or the like may be different between the still image capturing mode and the moving image capturing mode.

In S404, whether a focal length set by the zoom driving controller 102 is equal to or larger than a threshold f1 (e.g., a 35 mm image sensor-equivalent focal length of 100 mm) is checked. In S404, if the focal length is equal to or larger than the threshold f1, the processing proceeds to S405, and if it is determined that the duration during which the fluctuation amount absolute value |S| is equal to or smaller than the threshold S2 has continued for a threshold T2 [second] (e.g., 2 seconds) or longer, the shake compensation mode is determined to be the constant point capturing mode (fixed point capturing mode). Note that in the present embodiment, the shake compensation mode is determined to be the constant point capturing mode (fixed point capturing mode) if the focal length is equal to or larger than the threshold f1, but the camera may be caused to enter this mode by operating the operation unit 115, or a hysteresis may be provided by providing two different thresholds, namely a threshold indicating that the camera enters the constant point capturing mode (fixed point capturing mode) and a threshold indicating that the camera exits the constant point capturing mode (fixed point capturing mode).

Meanwhile, if in S404 the focal length is equal to or smaller than f1, the processing proceeds to S406, and whether or not the focal length is equal to or smaller than f2 (where f2 is smaller than f1) is checked. If, in S406, the focal length is equal to or smaller than f2, the shake compensation mode is determined to be the large shake correction mode, and the shake compensation mode determination ends. Note that the method for large shake correction mode determination may be based on the size or frequency of the shake amount. If determination in S405 and S406 is "NO", the shake compensation mode is determined to be the normal moving image mode, and the shake compensation mode determination ends.

Note that the fluctuation amount thresholds in the determination here have the relationship of S1<S2<S3. The shake compensation determination processing based on the image capturing state of the camera and the camera shake amount has been described above, but it is an example, and it is also possible to use other parameters and conditions. Furthermore, even if not all compensation modes describe above are available, the processing in the present invention can be executed as long as two or more shake compensation modes are available, and other shake compensation modes than those mentioned above may also be used. For example, a rotational shake correction mode for correcting shake occurring around an optical axis, and a mode for correcting a tilt or a trapezium distortion at the time of the moving image capturing mode may also be added. Of course, a shake compensation off mode and an icon indicating this mode may also be used, and the icon may have a different color from usual icons for the purpose of warning.

As described above, the shake compensation modes include a group of a plurality of shake compensation modes for the moving image capturing mode and a group of a plurality of shake compensation modes for the still image capturing mode. Further, at least one shake compensation mode to be used is different between the shake compensation modes for the moving image capturing mode and those for the still image capturing mode. So far, examples of various shake compensation modes have been described, while aside from the above-described modes, shake compensation modes with different characteristics may be applied depending on various image capturing situations. Further, in addition to the correction mode based on optical anti-vibration, a correction mode based on electronic anti-vibration using image synthesis or motion vectors may also be used in combination.

FIG. 3 shows an example of icons serving as display items associated with the respective shake compensation modes. Note that the types of icon shown in FIG. 3 are exemplary icons that represent the respective shake compensation modes. Next, display of the shake compensation mode icons in the image capturing apparatus according to the present embodiment will be described with reference to FIGS. 5A and 5B.

Figure 5A:
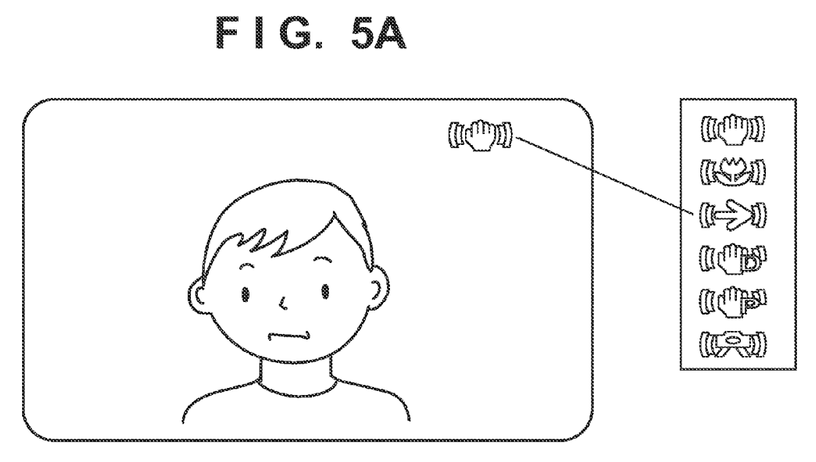
FIGS. 5A and 5B are diagrams showing exemplary display of shake compensation mode display icons.

In FIG. 5A, an icon corresponding to the shake compensation mode under execution selected in accordance with an image capturing situation and a camera shake status is displayed at the upper right of the display screen. The camera system controller 118 selects the shake compensation mode for performing optimum image blurring correction based on information on the selected image capturing mode, the camera shake amount, the focal length, the object distance, and the like, and executes the selected mode. Note that known processing can be applied when the shake compensation mode is thus selected. The camera system controller 118 then displays an icon corresponding to the shake compensation mode under execution on the display screen of the display unit 112 to notify the user of which shake compensation mode has been selected and is under execution. The image capturing situation and the camera shake status vary moment-by-moment, and upon the shake compensation mode being switched in accordance with the situation, the icon display is also switched in synchronism with the switching of the mode.

Figure 5B:
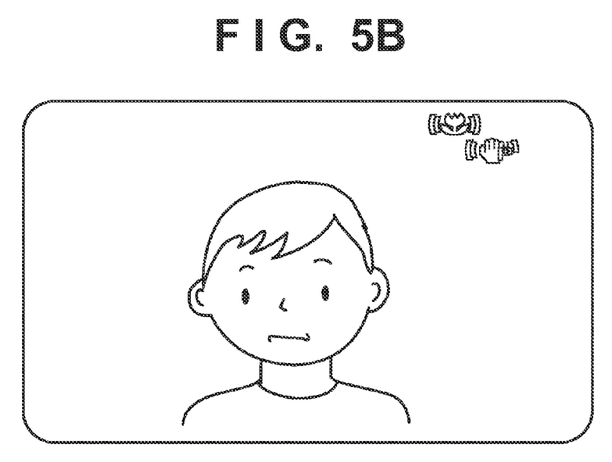

If whether or not the respective shake compensation modes need to be executed is determined separately, in some cases the situation of image capturing operation may correspond to a correction mode in which several shake compensation modes need to be executed. For example, when an image of a close object is being captured by using macro photography (i.e., the object distance is short) during moving image capturing at the telephoto end side while the camera is firmly held, both the shift shake correction mode and the constant point capturing mode (fixed point capturing mode) can be the modes to be executed. If there are several shake compensation modes to be executed as mentioned above, those shake compensation modes may be caused to work simultaneously, and all icons corresponding to those modes may be displayed as shown in FIG. 5B.

Alternatively, the display priorities of the icons may be decided in advance, and if there are several shake compensation modes to be executed, those shake compensation modes may be caused to work simultaneously, while an icon to be displayed may be decided in accordance with the display priorities. For example, among the icons corresponding to several shake compensation modes to be executed, only the icon of the highest display priority may be displayed. Further, execution priorities of the shake compensation modes may be set, and if there are several shake compensation modes to be executed, one or a predetermined number of shake compensation modes may be selected and executed in accordance with the execution priorities. Also in this case, the display icons corresponding to all shake compensation modes under execution may be displayed, or only the icon of the highest display priority may be displayed.

Figure 6:
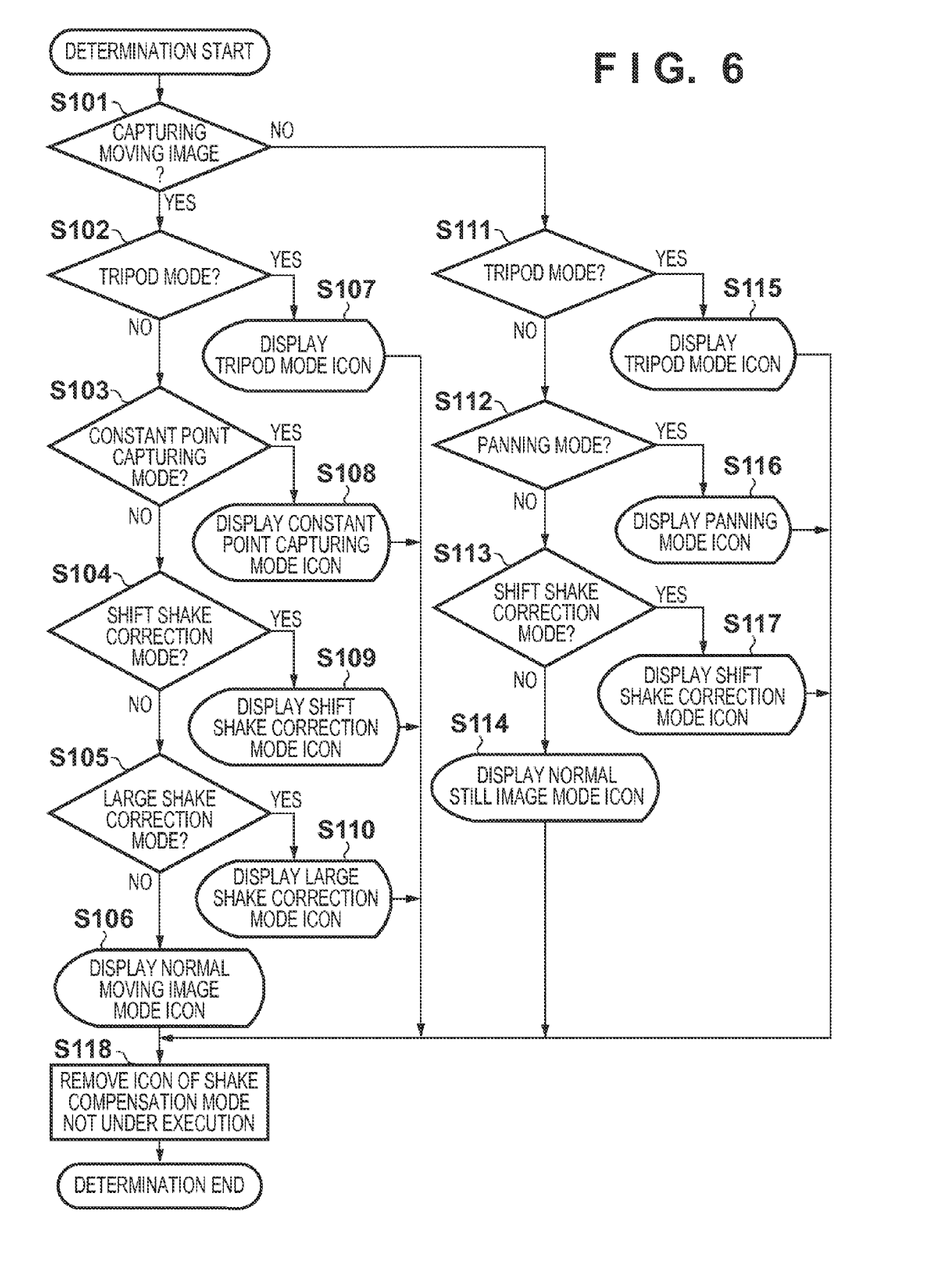
FIG. 6 is a flowchart showing processing for deciding the shake compensation mode icon according to an embodiment.

Next, processing for displaying the shake compensation mode icons will be described with reference to FIG. 6. Note that FIG. 6 shows an example of processing for displaying the icon of the highest display priority. In the processing shown in FIG. 6, the display priorities for the moving image capturing mode is set in the order of the "tripod mode", the "constant point capturing mode (fixed point capturing mode)", the "shift shake correction mode", the "large shake correction mode", and the "normal moving image mode". The priorities for the still image capturing mode is set in the order of the "tripod mode", the "panning mode", the "shift shake correction mode", and the "normal still image mode".

Note that if several shake compensation modes are selected based on the image capturing situation as mentioned above, the selected shake compensation modes may be caused to work simultaneously, or only a shake compensation mode of a high priority among the selected shake compensation modes may be executed. In the configuration in which the shake compensation mode of a high priority is executed, the icon corresponding to the shake compensation mode under execution is displayed on the display screen. Further, depending on situations at different times, several shake compensation modes may be executed, or a single shake compensation mode of a high priority may be executed.

The camera system controller 118 decides which of the above-described shake compensation modes to execute based on information on the image capturing status of the image capturing apparatus such as the image capturing mode, the camera shake amount, the focal length, the object distance, or the like, and executes the decided shake compensation mode. The icon display determination processing shown in FIG. 6 is performed in a predetermined cycle (at predetermined intervals) (e.g., 50 ms), and the corresponding icon is displayed in accordance with the shake compensation mode under execution.

First, in S101, the camera system controller 118 determines whether the image capturing mode is the moving image capturing mode or the still image capturing mode. If the image capturing mode is determined to be the moving image capturing mode, the processing proceeds to S102. In S102, the camera system controller 118 checks whether or not the shake compensation mode under execution is the tripod mode. If the shake compensation mode is determined to be the tripod mode, the processing proceeds to S107, and the camera system controller 118 displays the tripod mode icon. Note that, as shown in FIG. 3, the tripod mode exists in both the still image capturing mode and the moving image capturing mode, and the same icon is used as the tripod mode icon in the still image capturing mode and the moving image capturing mode. However, an icon for a shake compensation mode existing both the still image capturing mode and the moving image capturing mode, such as the tripod mode, may differ in the still image capturing mode and the moving image capturing mode. In S102, if the shake compensation mode is not determined to be the tripod mode, the processing proceeds to S103, and whether or not the shake compensation mode under execution is the constant point capturing mode (fixed point capturing mode) is checked. If the shake compensation mode is determined to be the constant point capturing mode (fixed point capturing mode), the processing proceeds to S108, and the camera system controller 118 displays the constant point capturing mode icon (fixed point capturing mode icon).

In S104, the camera system controller 118 checks whether or not the shake compensation mode under execution is the shift shake correction mode. If the shake compensation mode is determined to be the shift shake correction mode, the processing proceeds to S109, and the camera system controller 118 displays the shift shake correction mode icon. In S104, if the shake compensation mode is not determined to be the shift shake correction mode, the processing proceeds to S105, and whether or not the shake compensation mode under execution is the large shake correction mode is checked. If the shake compensation mode is determined to be the large shake correction mode, the processing proceeds to S110, and the camera system controller 118 displays the large shake correction mode icon. If the shake compensation mode under execution does not fall under any of the shake compensation modes determined in S102 to S105, the normal moving image mode is under execution, and accordingly, in S106 the normal moving image mode icon is displayed. Lastly, in S118, the icons for the shake compensation modes that are not under execution are removed. The above is the determination flow for the shake compensation mode icon display during moving image capturing.

Next, the icon display flow during still image capturing will be described. In the case of the still image capturing mode, the processing proceeds from S101 to S111. In S111, the camera system controller 118 checks whether or not the shake compensation mode under execution is the tripod mode. If the shake compensation mode is determined to be the tripod mode, the processing proceeds to S115, and the camera system controller 118 displays the tripod mode icon. Here, in the present embodiment, the same tripod icon is used during moving image capturing and during still image capturing, but different icons between the respective image capturing modes may be displayed. The same applies to the shift shake correction mode icon described later.

In S111, if the shake compensation mode is not determined to be the tripod mode, the processing proceeds to S112, and whether or not the shake compensation mode under execution is the panning mode is checked. If the shake compensation mode is determined to be the panning mode, the processing proceeds to S116, and the camera system controller 118 displays the panning mode icon.

In S112, if the shake compensation mode is not determined to be the panning mode, the processing proceeds to S113. In S113, the camera system controller 118 checks whether or not the shake compensation mode under execution is the shift shake correction mode. If the shake compensation mode is determined to be the shift shake correction mode, the processing proceeds to S117, and the camera system controller 118 displays the shift shake correction mode icon. If the shake compensation mode under execution does not fall under any of the shake compensation modes determined in S111 to S113, the camera system controller 118 determines that the shake compensation mode under execution is the normal still image mode, and advances the processing to S114. In S114, the camera system controller 118 displays the normal still image mode icon. Lastly, in S118, the icons for the shake compensation modes that are not under execution are removed. The above is the determination flow for the shake compensation mode icon display during still image capturing.

Note that is the icons corresponding to all shake compensation modes under execution are displayed, for example, the processing may be advanced from S107, S108, S109, S115, and S116 to S103, S104, S105, S112, and S113, respectively. In this case, it is determined whether or not the shake compensation mode in execution is normal moving image mode. If it is determined to be the normal moving image mode, the normal moving image mode icon is displayed. Also, in S114, it is determined whether or not the shake compensation mode in execution is normal still image mode. If it is determined to be the normal still image mode, the normal still image mode icon is displayed.

Note that when deciding the icon to be displayed, determination of the shake compensation modes may be frequently switched depending on the image capturing situation. In that case, if icon display is frequently switched in accordance with the switching of determination, a user may feel uncomfortable. Therefore, in the present embodiment, display may be switched if the same shake compensation mode is selected several times: for example, the icon display may be decided if the same shake compensation mode is selected consecutively for a predetermined number of times (e.g., three times). For example, if the shake compensation mode corresponding to the currently displayed icon is terminated and it is confirmed consecutively for the predetermined number of times at predetermined intervals that this shake compensation mode has stopped, the camera system controller 118 removes the corresponding icon display. Similarly, if execution of a new shake compensation mode whose icon is not currently displayed has started and it is confirmed consecutively for the predetermined number of times at predetermined intervals that this new shake compensation mode is under execution, the camera system controller 118 starts the corresponding icon display.

Figure 7:
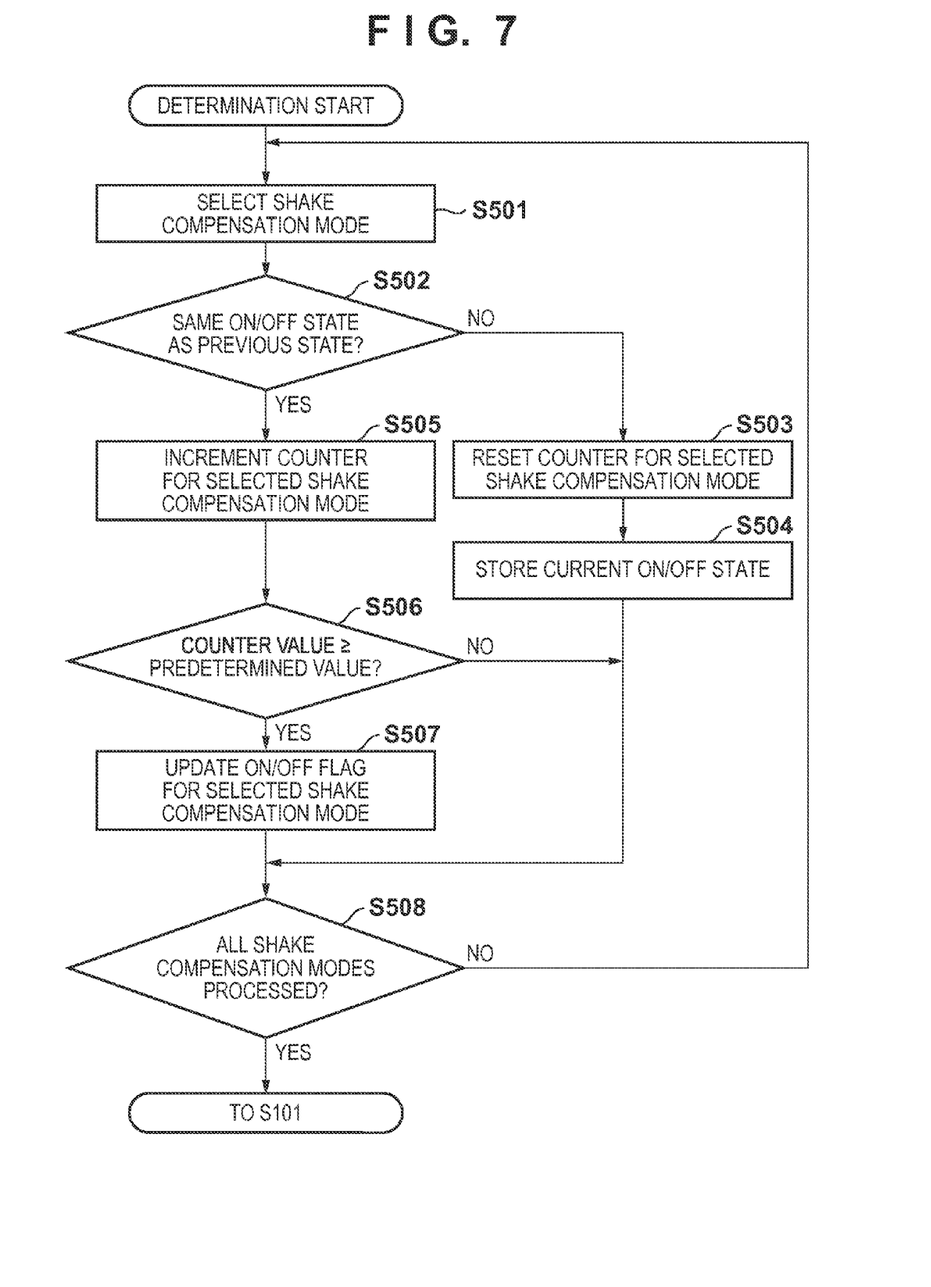
FIG. 7 is a flowchart showing processing for deciding the shake compensation mode icon according to an embodiment.

The above-described processing can be implemented by, for example, adding the processing shown in FIG. 7 prior to S101 in FIG. 6. First, in S501, the camera system controller 118 selects one of the shake compensation modes. In S502, the camera system controller 118 determines whether or not the on/off state of the selected shake compensation mode agrees with the previous on/off state. For example, the camera system controller 118 stores the previous on/off states of the respective shake compensation modes in a RAM provided therein (hereinafter simply referred to as RAM) that is not shown in the figure. The camera system controller 118 determines whether or not the on/off state of the selected shake compensation mode agrees with the on/off state stored in the RAM. If the current and previous on/off states do not agree with each other, the processing proceeds to S503. The RAM is provided with counters for the respective shake compensation modes as well as the above-described on/off states, and in S503 the camera system controller 118 resets the counter corresponding to the selected shake compensation mode. In S504, the camera system controller 118 stores the current on/off state in the RAM. After that, the processing proceeds to S508.

Meanwhile, if in S502 the current on/off state is determined to be the same as the previous one, the processing proceeds to S505. In S505, the camera system controller 118 increments the counter corresponding to the selected shake compensation mode by 1. In S506, the camera system controller 118 determines whether or not the counter value is equal to or larger than a predetermined value. If the counter value is not equal to or larger than the predetermined value, the processing proceeds directly to S508. If the counter value is equal to or larger than the predetermined value, in S507 the camera system controller 118 updates an on/off flag corresponding to the selected correction mode in accordance with the current on/off state.

In S508, whether or not the above-described processing has been performed with respect to all shake compensation modes is determined, and if any shake compensation mode has not been subjected to the processing, the processing is returned to S501 and the above-described processing is repeated on the new shake compensation mode. After the above-described processing is finished with respect to all shake compensation modes, the processing is advanced to S101 in FIG. 6. Note that in S102 to S105, S111 to S113, and S118 in FIG. 6, whether the respective shake compensation modes are under execute or not under execute is determined based on the status of the on/off flag.

As described above, the image capturing apparatus according to the present embodiment is capable of selectively executing an optimum shake compensation mode suitable for the image capturing situation during moving image capturing and still image capturing, and clearly notifying the user of the execution status thereof.

Other Embodiments

Note that in the above-described embodiment, the digital camera capable of capturing still images and moving images has been described as the image capturing apparatus, but the image capturing apparatus is not limited thereto. For example, the present invention can be applied also to electronic devices such as game machines having an image capturing function, communication devices such as mobile phones having an image capturing function, and the like, and the same advantage as in the above-described embodiment can be obtained.

As described above, according to the above-described embodiment, an advantage that a user can easily recognize the status of image blurring correction under execution is achieved.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-179208, filed Aug. 18, 2011, and No. 2012-150752, filed Jul. 4, 2012, which are hereby incorporated by reference herein in their entirety.

What is claimed is:

1. An image capturing apparatus having a plurality of image blurring correction modes which have correction effects that are different from each other, comprising:
   a selection unit configured to select an image blurring correction mode for execution from amongst the plurality of image blurring correction modes; and
   a display control unit configured to display, on a display screen, a display item corresponding to the image blurring correction mode selected by said selection unit while said image capturing apparatus is operating in an image capturing mode, wherein the selection unit is configured to automatically select an image blurring correction mode from amongst the plurality of image blurring correction modes for execution, in accordance with an image capturing situation.

2. The apparatus according to claim 1, wherein said image capturing apparatus has a moving image capturing mode and a still image capturing mode, and
the plurality of image blurring correction modes includes image blurring modes corresponding to the moving image capturing mode and the still image capturing mode, respectively.

3. The apparatus according to claim 1, wherein the plurality of image blurring correction modes includes a mode which stops at least image blurring correction.

4. The apparatus according to claim 1, wherein the plurality of image blurring correction modes includes image blurring correction mode appropriate for an image capturing by panning.

5. The apparatus according to claim 4, wherein in the image blurring correction mode appropriate for image capturing by panning, when a camera is moved in one direction, image blurring correction in camera moving direction is stopped, and image blurring correction is performed only on components orthogonal to the camera moving direction.

6. The apparatus according to claim 1, wherein the plurality of image blurring correction modes includes an image blurring correction mode appropriate for a still image capturing mode with small object distance.

7. The apparatus according to claim 6, wherein in the image blurring correction mode appropriate for a still image capturing mode with small object distance, both angle shake and shift shake are corrected.

8. The apparatus according to claim 1, wherein the plurality of image blurring correction modes includes an image blurring correction mode appropriate for a moving image capturing mode in which a focal length is larger than a predetermined value.

9. The apparatus according to claim 8, wherein in the image blurring correction mode appropriate for a moving image capturing mode in which the focal length is larger than a predetermined value, an anti-vibration effect on a lower frequency shake is enhanced.

10. The apparatus according to claim 1, wherein the plurality of image blurring correction modes includes an image blurring correction mode appropriate for a moving image capturing mode in which a focal length is smaller than a predetermined value.

11. The apparatus according to claim 10, wherein in the image blurring correction mode appropriate for a moving image capturing mode in which the focal length is smaller than a predetermined value, an image blurring correction effect is enhanced more than usual by broadening the image blurring correction range on a wide-angle end side.

12. A control method of an image capturing apparatus having a plurality of image blurring correction modes which have correction effects that are different from each other, comprising:

a selection step of selecting an image blurring correction mode for execution from amongst the plurality of image blurring correction modes; and
a display control step of displaying, on a display screen, a display item corresponding to the image blurring correction mode selected in the selection step while said image capturing apparatus is operating in an image capturing mode, wherein the selection step automatically selects an image blurring correction mode from amongst the plurality of image blurring correction modes for execution, in accordance with an image capturing situation.

13. The method according to claim 12, wherein said image capturing apparatus has a moving image capturing mode and a still image capturing mode, and
the plurality of image blurring correction modes include image blurring modes corresponding to the moving image capturing mode and the still image capturing mode, respectively.

14. The method according to claim 12, wherein the plurality of image blurring correction modes includes a mode which stops at least an image blurring correction.

15. An image capturing apparatus having a plurality of image blurring correction modes, comprising:
a detection unit configured to detect a status of said image capturing apparatus;
a switching unit configured to automatically switch an image blurring correction mode for execution, in accordance with the status detected by the detection unit, from among the plurality of image blurring correction modes which have correction effects that are different from each other; and
a display control unit configured to display, on a display screen, a display item corresponding to the image blurring correction mode being executed in response to an image blurring correction mode that is switched by the switching unit.

16. The apparatus according to claim 15, wherein the detection unit detects at least one of a capturing mode of said image capturing apparatus, an object distance, camera shake amount, camera shake duration and focal length.

17. A control method of an image capturing apparatus having a plurality of image blurring correction modes, comprising:
a detection step of detecting a status of said image capturing apparatus;
a switching step of automatically switching an image blurring correction mode for execution, in accordance with the status detected in the detection step, from among the plurality of image blurring correction modes which have correction effects that are different from each other; and
a display control step of displaying, on a display screen, a display item corresponding to the image blurring correction mode being executed in response to an image blurring correction mode that is switched in the switching step.

18. The method according to claim 17, wherein the detection step detects at least one of a capturing mode of said image capturing apparatus, an object distance, camera shake amount, camera shake duration and focal length.

* * * * *